US012808843B2

(12) United States Patent
Takeuchi et al.

(10) Patent No.: US 12,808,843 B2
(45) Date of Patent: Nov. 24, 2026

(54) CAPILLARY ELECTROPHORESIS DEVICE AND OPTICAL PERFORMANCE DIAGNOSTIC METHOD FOR SAME

(71) Applicant: Hitachi High-Tech Corporation, Tokyo (JP)

(72) Inventors: Shinji Takeuchi, Tokyo (JP); Takashi Gomi, Tokyo (JP); Motohiro Yamazaki, Tokyo (JP); Takehiko Shibasaki, Tokyo (JP); Katsunari Maruoka, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 73 days.

(21) Appl. No.: 18/880,596

(22) PCT Filed: Aug. 29, 2022

(86) PCT No.: PCT/JP2022/032426

§ 371 (c)(1),
(2) Date: Jan. 2, 2025

(87) PCT Pub. No.: WO2024/047702

PCT Pub. Date: Mar. 7, 2024

(65) Prior Publication Data

US 2025/0389615 A1 Dec. 25, 2025

(51) Int. Cl.

*G01N 27/447* (2006.01)
*G01M 11/02* (2006.01)
*G01N 21/65* (2006.01)

(52) U.S. Cl.

CPC ... *G01N 27/44756* (2013.01); *G01M 11/0207* (2013.01); *G01N 21/65* (2013.01); *G01N 27/447* (2013.01); *G01N 27/44721* (2013.01)

(58) Field of Classification Search

CPC ............ G01M 11/0207; G01N 27/447; G01N 27/44756; G01N 27/44721; G01N 21/65
See application file for complete search history.

(56) References Cited

U.S. PATENT DOCUMENTS

2001/0040094 A1* 11/2001 Inaba ............... G01N 27/44721 204/603
2006/0091012 A1* 5/2006 Shimizu ........... G01N 27/44782 204/603

(Continued)

FOREIGN PATENT DOCUMENTS

JP 2001-324472 A 11/2001
JP 2007-212449 A 8/2007

(Continued)

OTHER PUBLICATIONS

International Search Report (PCT/ISA/210) issued in PCT Application No. PCT/JP2022/032426 dated Oct. 11, 2022 with English translation (5 pages).

(Continued)

*Primary Examiner* — Michael P LaPage
(74) *Attorney, Agent, or Firm* — Crowell & Moring LLP

(57) ABSTRACT

An object of the present invention is to provide a capillary electrophoresis device and an optical performance diagnostic method for the same that are capable of checking optical performance without performing special work. Therefore, according to the present invention, the capillary electrophoresis device includes a capillary array including a plurality of capillaries, a light source that causes laser light to oscillate, a detecting unit that detects light emitted when the capillary array is irradiated with the laser light, and a control unit that performs predetermined processing based on a signal from the detecting unit. The control unit extracts a predetermined absolute value regarding an optical index based on an image captured by the detecting unit, and (Continued)

calculates the optical index by comparing the extracted absolute value with a predetermined reference value.

4 Claims, 6 Drawing Sheets

(56) References Cited

U.S. PATENT DOCUMENTS

| | | | | |
|---|---|---|---|---|
| 2007/0163882 | A1 | 7/2007 | Yamazaki et al. | |
| 2013/0135618 | A1 | 5/2013 | Zenhausern et al. | |
| 2020/0003728 | A1 | 1/2020 | Majumdar et al. | |
| 2022/0229013 | A1* | 7/2022 | Sumida | G01N 21/6428 |
| 2022/0365025 | A1 | 11/2022 | Tomiyoshi et al. | |

FOREIGN PATENT DOCUMENTS

| | | | | |
|---|---|---|---|---|
| JP | 2014-194362 | A | 10/2014 | |
| JP | 2016-14609 | A | 1/2016 | |
| JP | 2020-510822 | A | 4/2020 | |
| WO | WO-2020245961 | A1 * | 12/2020 | G01N 27/44782 |
| WO | WO 2021/095082 | A1 | 5/2021 | |

OTHER PUBLICATIONS

Japanese-language Written Opinion (PCT/ISA/237) issued in PCT Application No. PCT/JP2022/032426 dated Oct. 11, 2022 with English translation (7 pages).

* cited by examiner

CAPILLARY ELECTROPHORESIS DEVICE AND OPTICAL PERFORMANCE DIAGNOSTIC METHOD FOR SAME

TECHNICAL FIELD

The present invention relates to a capillary electrophoresis device and an optical performance diagnostic method for the same.

BACKGROUND ART

Capillary electrophoresis devices are widely used as devices for analyzing DNA base sequences or base lengths. In each of the capillary electrophoresis devices, when a capillary array is replaced, there is a possibility that a positional relationship of an optical system may shift. Therefore, for example, as described in Patent Literature 1, a technique is known in which data obtained by electrophoresis is normalized using wavelength calibration data obtained before shipment.

CITATION LIST

Patent Literature

Patent Literature 1: Japanese Unexamined Patent Application Publication No. 2007-212449

SUMMARY OF INVENTION

Technical Problem

However, to check the optical performance of a capillary electrophoresis device after shipment, a manual operation by a service engineer or the like has been required.

An object of the present invention is to provide a capillary electrophoresis device and an optical performance diagnostic method for the same that are capable of checking optical performance without performing special work.

Solution to Problem

To solve the above-described problem, according to the present invention, a capillary electrophoresis device includes a capillary array including a plurality of capillaries, a light source that causes laser light to oscillate, a detecting unit that detects light emitted when the capillary array is irradiated with the laser light, and a control unit that performs predetermined processing based on a signal from the detecting unit. The control unit extracts a predetermined absolute value related to an optical index based on an image captured by the detecting unit, and calculates the optical index by comparing the extracted absolute value with a predetermined reference value.

Advantageous Effects of Invention

According to the present invention, it is possible to provide a capillary electrophoresis device and an optical performance diagnostic method for the same that are capable of checking optical performance without performing special work.

DESCRIPTION OF EMBODIMENTS

Figure 1:
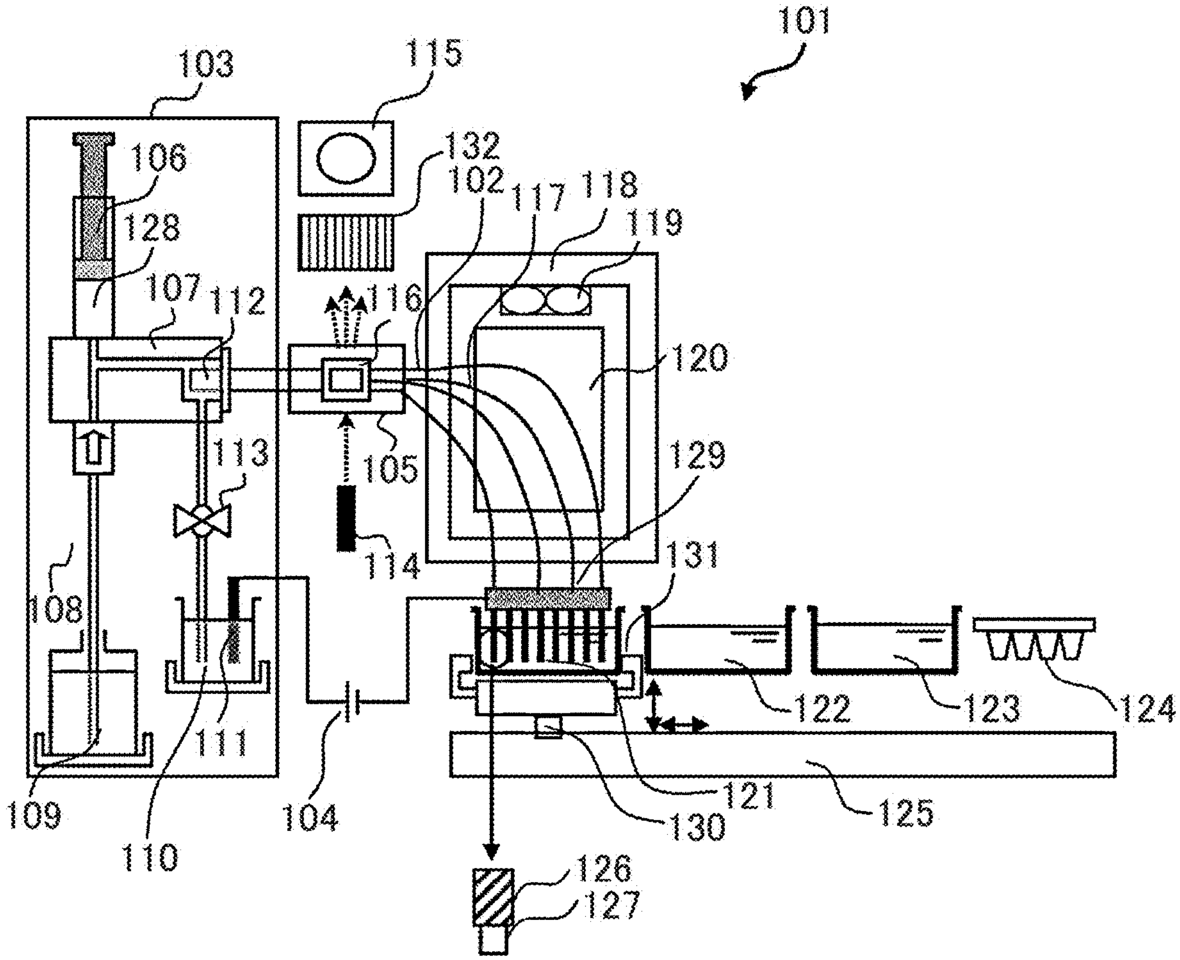
FIG. 1 is a schematic diagram of a capillary electrophoresis device.

A configuration of a capillary electrophoresis device according to an embodiment of the present invention will be described with reference to FIG. 1. FIG. 1 is a schematic diagram of the capillary electrophoresis device according to the present embodiment. As illustrated in FIG. 1, the capillary electrophoresis device 101 includes a capillary array 117 including one or more capillaries 102, a constant-temperature bath 118 that keeps the capillaries 102 at constant temperature, a high-voltage power supply 104 that applies a voltage to the capillaries 102, a pump mechanism 103 that injects polymer into the capillaries 102, and a conveyance mechanism 125. The conveyance mechanism 125 is a mechanism that conveys a buffer container 121, a cleaning container 122, a waste liquid container 123, and a sample container 124 to capillary cathode ends 127.

The capillary array 117 includes a load header 129 provided at one end, a capillary head 112 provided at the other end, and a detecting area 116 that is formed between the load header 129 and the capillary head 112 and from which a two-dimensional detecting unit 115 detects a sample electrophoresis in the capillaries 102. When the capillary array 117 includes, for example, 24 capillaries 102 and a measurement method is changed, the capillary array 117 is replaced with a capillary array having a different capillary length. In addition, even if a capillary 102 is damaged or deteriorates in quality, it is replaced with a new capillary array 117.

The capillaries 102 are formed of glass tubes having an inner diameter of 50 μm and an outer diameter of 320 μm, and have surfaces coated with polyimide in order to improve their strength. However, the polyimide coating at the detecting area 116 that is irradiated with laser light is removed from the capillaries 102 such that light emitted from the inside easily leaks to the outside. The inside of each of the capillaries 102 is filled with a separation medium by a pump mechanism 103 to provide a migration difference during electrophoresis. In the present embodiment, as the separation medium, polymer that is a high-viscosity solution is used.

The capillary cathode ends 127 are fixed through metal hollow electrodes 126, and tips of the capillaries 102 protrude from the hollow electrodes 126 by about 0.5 mm. In addition, the hollow electrodes 126 provided for each of the capillaries 102 are all integrally attached to the load header 129. Further, all the hollow electrodes 126 are electrically connected to the high voltage power supply 104 mounted on a main body of the device, and operate as cathode electrodes when a voltage is applied such as during electrophoresis or sample introduction.

Capillary end portions located opposite to the capillary cathode ends 127 are bundled and bonded together by the capillary head 112. The capillary head 112 is connected to a block 107 in a pressure-resistant and airtight manner. The capillaries 102 are filled with new polymer by the pump mechanism 103. Polymer refilling in the capillaries 102 is performed for each measurement in order to improve the performance of the measurements.

An optical system includes a light irradiation mechanism 114 that irradiates the detecting area 116, an array holder 105 that holds the detecting area 116, a spectrometer 132 that separates light emitted in the detecting area 116 into wavelengths, and a two-dimensional detecting unit 115 that detects the separated light. To detect a sample in the capillaries 102 that has been separated by electrophoresis, the light irradiation mechanism 114 irradiates the detecting area 116, the spectrometer 132 separates light emitted from the detecting area 116, and the two-dimensional detecting unit 115 detects the sample. The two-dimensional detecting unit 115 is, for example, a CCD camera and transmits detected image data to a control unit not illustrated.

The control unit controls operations of the high-voltage power supply 104 and the like, and calculates results of analyzing the sample based on a signal detected by the two-dimensional detecting unit 115. Further, the control unit is connected to an input unit to which settings and the like are input, an output unit that displays the analysis results and the like, and a storage unit that stores the analysis results and the like (the units are not illustrated).

The constant-temperature bath 118 is covered with a heat insulating material, and the inside of the constant-temperature bath 118 is controlled to a fixed temperature by a heating and cooling mechanism 120. In addition, a fan 119 circulates and agitates air in the constant-temperature bath 118 to keep the temperature of the capillary array 117 uniform and constant.

The pump mechanism 103 includes a plunger pump 106, the block 107, a check valve 108, an electric valve 113, a polymer container 109, and an anode buffer container 110. The block 107 is provided with a flow path communicating the plunger pump 106, the polymer container 109, the anode buffer container 110, and the capillary array 117. In a flow path between the plunger pump 106 and the polymer container 109, the check valve 108 that prevents polymer from flowing backwards is provided. In a flow path between the block 107 and the anode buffer container 110, the electric valve 113 is provided. To fill a chamber 128 of the plunger pump 106 and the capillary array 117 with polymer, the electric valve 113 is closed to prevent a buffer solution from flowing into them from the anode buffer container 110. To perform electrophoresis, the electric valve 113 is opened and an anode electrode 111 and the capillary cathode ends 127 are energized.

The conveyance mechanism 125 includes three electric motors and a linear actuator (not illustrated) and is capable of moving in three axes, that is, in vertical, horizontal, and depth directions. In addition, one or more containers can be placed on a moving stage 130 of the conveyance mechanism 125. Further, the moving stage 130 is provided with an electric grip 131 that can grip and release each container. Therefore, it is possible to convey the buffer container 121, the cleaning container 122, the waste liquid container 123, and the sample container 124 to the load header 129 as necessary. An unnecessary container is stored in a designated storage space within the device.

Figure 2:
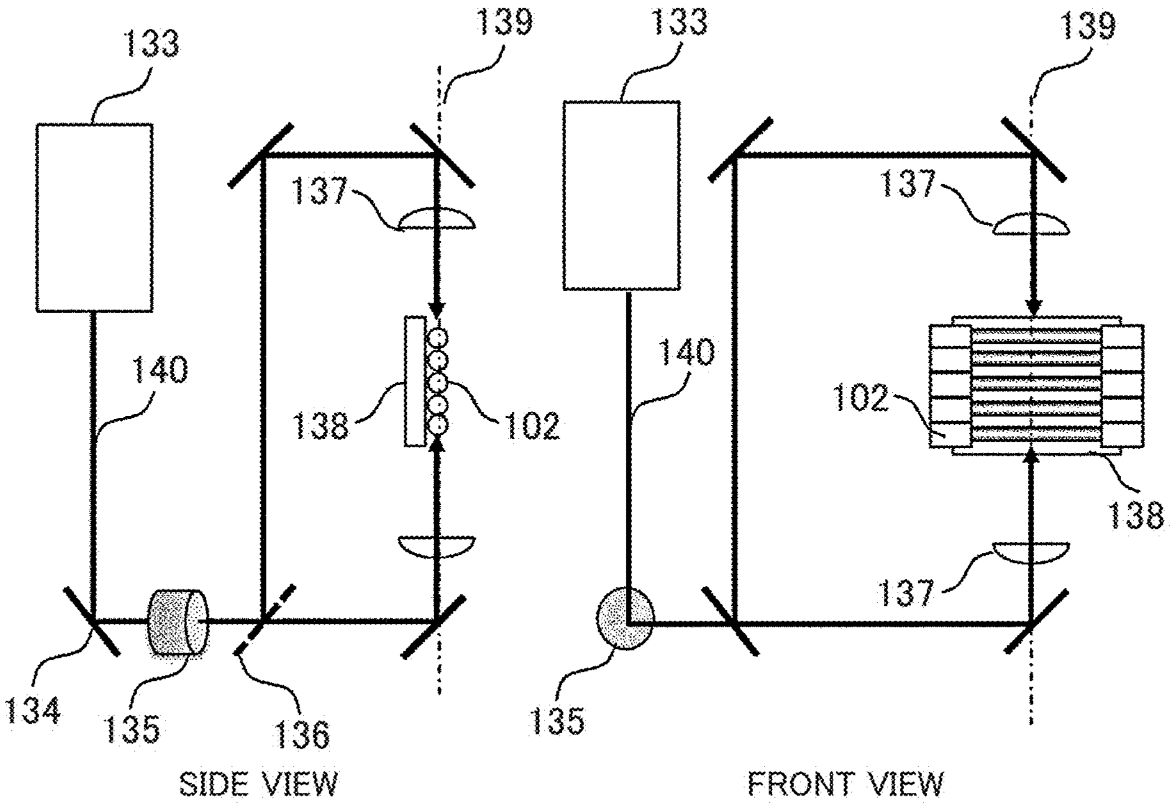
FIG. 2 is a diagram schematically illustrating a laser light path in an optical irradiation system of the capillary electrophoresis device.

FIG. 2 is a diagram schematically illustrating a laser light path in an optical irradiation system of the capillary electrophoresis device according to the present embodiment. The light irradiation mechanism 114 according to the present embodiment includes a laser unit 133 that is a light source that causes laser light 140 to oscillate, a beam splitter 136 that splits the laser light 140 into two beams, a reflecting mirror 134 that changes the path of the laser light 140, and a condenser lens 137 that condense the laser light 140. A polarizer 135, which is an optical element that transmits only light polarized in one direction, is inserted on an optical path between the laser unit 133 and the beam splitter 136. One of the beams of the laser light 140 split by the beam splitter 136 is guided to the lower side of the capillary array by the reflecting mirror 134, and the other is guided to the upper side of the capillary array by the reflecting mirror 134. Further, after each of the beams of the laser light 140 is condensed by the condenser lens 137, the beam is incident from an upper or lower end of the capillary array, and fluorescence emitted from the detecting area 116 of each of the capillaries 102 is detected by the two-dimensional detecting unit 115. The following description assumes a case where a CCD camera is used as the two-dimensional detecting unit 115.

Although FIG. 2 illustrates only 5 capillaries 102, the capillary array includes the 24 capillaries 102, and each of the capillaries 102 is fixed side by side along a reference base 138 in the detecting area 116 in the present embodiment. In the present specification, a virtual straight line orthogonal to each capillary axis on a virtual plane formed by the central axis (capillary axis) of each capillary on the reference base 138 is called an optical axis 139. In the present embodiment, the capillary array includes the 24 capillaries 102, the first capillary from the bottom is referred to as CAP1, and the 24th capillary from the bottom (the first capillary from the top) is referred to as CAP24, but the number of capillaries 102 is not limited to 24.

In this case, the optical performance of the capillary electrophoresis device depends on the position accuracy of the optical axis of the laser light, the position accuracy of the CCD camera, the accuracy of the focal point, and the like. The optical performance before shipment is adjusted in a manufacturing process, but it is also necessary after shipment to check the optical performance periodically or at the time of replacement of the capillary array and adjust the optical performance as necessary. A method for diagnosing the optical performance of the capillary electrophoresis device according to the present embodiment will be described below. Before Example of the present invention are described, Comparative Example will be described first.

Comparative Example

Figure 3A:
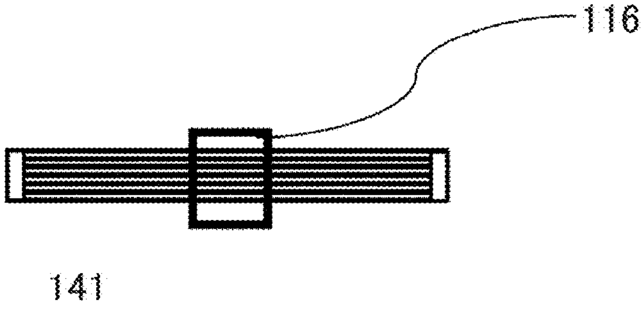
FIG. 3A is a diagram illustrating a calibration shield array.
Figure 3B:
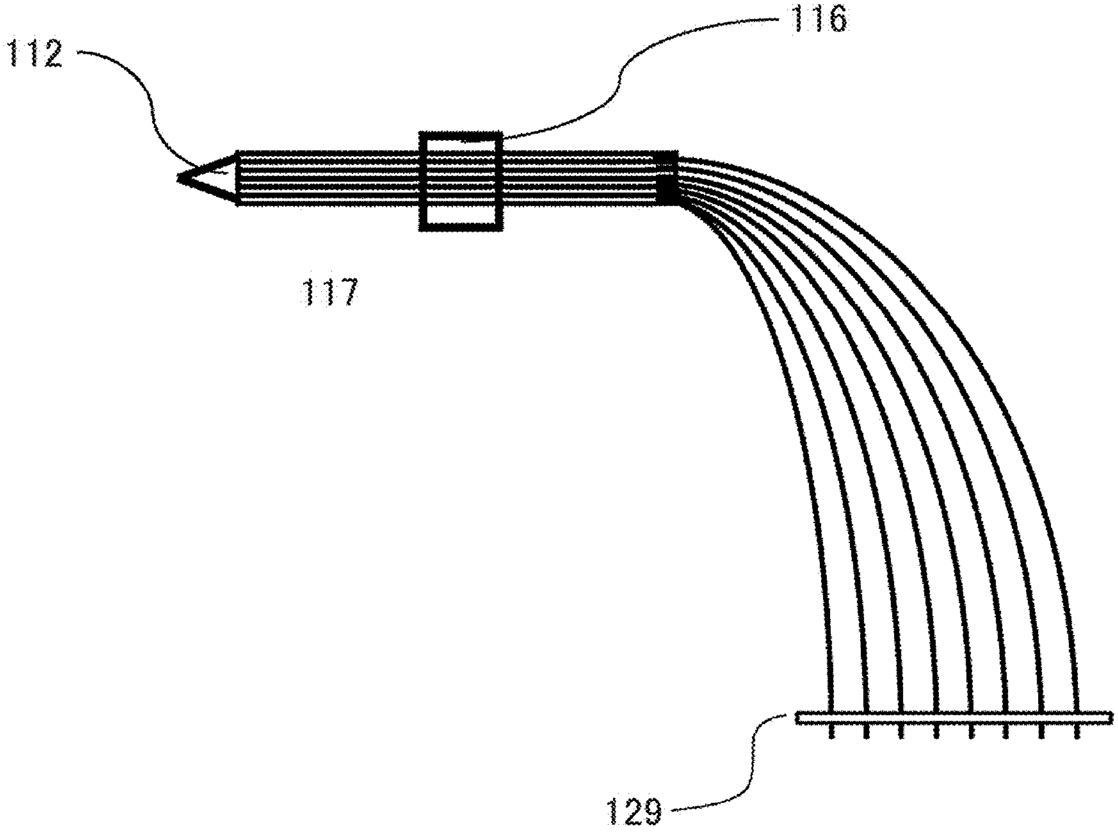
FIG. 3B is a diagram illustrating an analysis capillary array.

In Comparative Example, a calibration shield array 141 illustrated in FIG. 3A is used to diagnose the optical performance. Unlike the capillary array 117 for analysis illustrated in FIG. 3B, the shield array 141 is in a state in which a voltage for electrophoresis is not applied and DNA is not input. Both ends of each of the capillaries are sealed in the shield array 141, the shield array 141 is filled with a polymer solution (EG: ethylene glycol/UREA: urea), and the shield array is cut to a length (approximately 20 cm) that is easy to handle.

In Comparative Example, after shipment of the capillary electrophoresis device, mainly a service engineer uses the shield array 141 to diagnose the optical performance. The service engineer or the like sets the shield array 141 in an array holder 105, and the polymer solution (EG/UREA) with which each capillary is filled is irradiated with laser light such that a Raman signal is obtained. The service engineer or the like uses dedicated software to visually identify a peak value and the like of the Raman signal included in an image captured by the CCD camera. Since the optical performance includes a plurality of indices, it is necessary that the service engineer or the like use the CCD camera to capture an image for each of the indices and manually read a necessary value. The read value is transmitted to the control unit, and the control unit calculates an optical index.

In Comparative Example, the image captured by the CCD camera includes a pseudo signal obtained by the shield array simulating a capillary array rather than the actual capillary array, and thus the calculated optical index is relative. Therefore, the service engineer or the like determines whether the calculated optical index falls within a target value (specification) determined for the shield array in advance, and adjusts the optical axis of laser light, adjusts the position of the CCD camera, and the like. When the optical diagnosis ends, the service engineer or the like removes the calibration shield array from the capillary electrophoresis device, and attaches the analysis capillary array for actually performing electrophoresis to the capillary electrophoresis device.

A diagnostic method according to Comparative Example that is performed by the service engineer will be described in detail for each optical index.

<Coaxiality of Upper and Lower Beams (Laser Beam Over Lapping)>

As described above, in the capillary electrophoresis device according to the present embodiment, the capillary array is irradiated with laser light from above and below the capillary array. The laser light with which the capillary array is irradiated from above the capillary array may be referred to as an upper beam, and the laser light with which the capillary array is irradiated from below the capillary array may be referred to as a lower beam. In Comparative Example, coaxiality of the optical axis of the upper beam and the optical axis of the lower beam is calculated using an image of Raman scattered light obtained when irradiation with only the upper beam is performed, and an image of Raman scattered light obtained when irradiation with only the lower beam is performed. In a case where imaging is performed by irradiating with only the upper beam, the service engineer or the like uses the CCD camera to perform imaging in a state in which a light shielding plate is set on the optical path of the lower beam. In a case where imaging is performed by irradiating with only the lower beam, the service engineer or the like uses the CCD camera to perform imaging in a state in which a light shielding plate is set on the optical path of the upper beam.

Figure 4A:
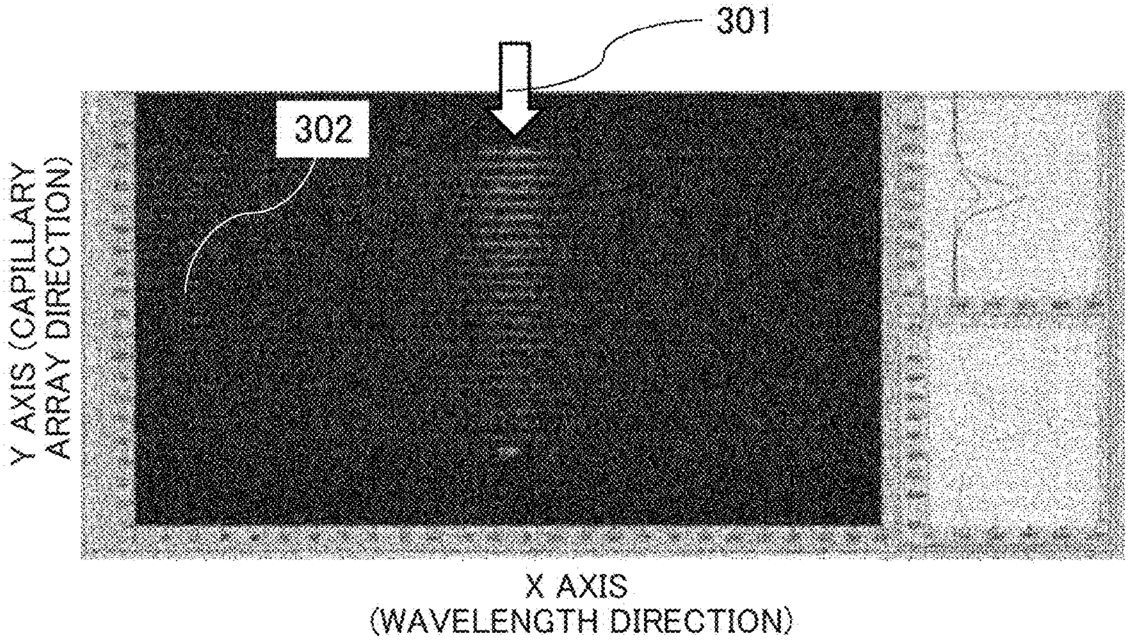
FIG. 4A is a diagram illustrating an example of an image acquired when the shield array is irradiated with only an upper beam.
Figure 4B:
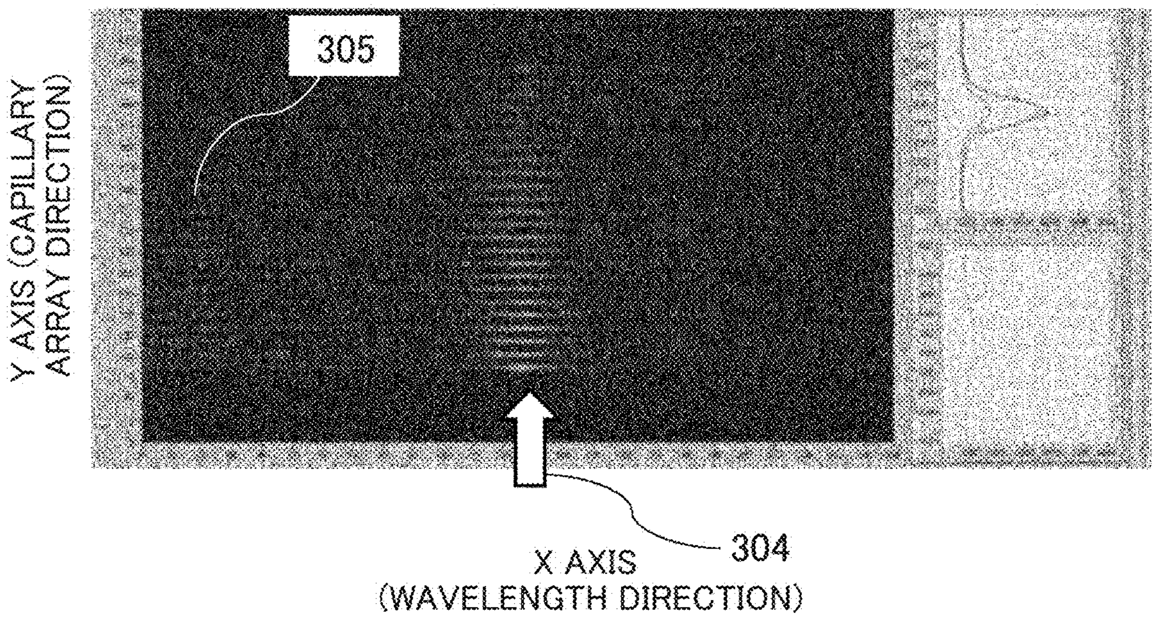
FIG. 4B is a diagram illustrating an example of an image acquired when the shield array is irradiated with only a lower beam.

FIG. 4A is a diagram illustrating an example of an image acquired when the shield array is irradiated with only the upper beam. FIG. 4B is a diagram illustrating an example of an image acquired when the shield array is irradiated with only the lower beam. The service engineer or the like identifies a short wavelength peak 302 of the center of the shield array in the vertical direction while visually checking the short wavelength peak 302 in FIG. 4A, and identifies a short wavelength peak 305 of the center of the shield array in the vertical direction while visually checking the short wavelength peak 305 in FIG. 4B. Then, the control unit extracts an X coordinate of the peak 302 obtained when the irradiation with only the upper beam 301 is performed and an X coordinate of the peak 305 obtained when the irradiation with only the lower beam 304 is performed, and outputs an optical index regarding the coaxiality of the upper and lower beams based on the difference between these coordinates. In a case where the output optical index is not in a range of a predetermined target value, that is, in a case where a shift between the optical axis of the upper beam and the optical axis of the lower beam is larger than a specification, the service engineer or the like adjusts the optical axis of the laser light.

<Horizontal Rotation Angle (Grating Rotation Angle)>

Figure 5:
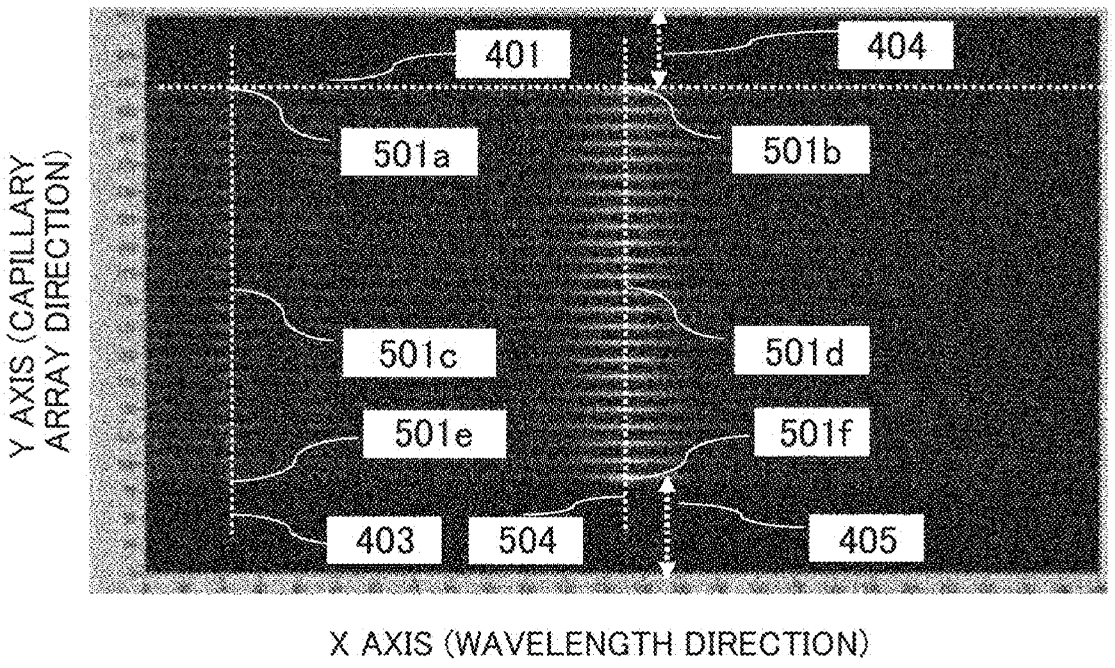
FIG. 5 is a diagram illustrating an example of an image acquired when the shield array is irradiated with the upper and lower beams.

In comparative example, to calculates an index for a horizontal rotation angle, a new single image is used separately from the two images used to calculate the index for the coaxiality of the upper and lower beams. FIG. 5 is a diagram illustrating an example of an image acquired when the shield array is irradiated with the upper and lower beams. The service engineer or the like identifies a long wavelength peak and a short wavelength peak of an end portion (CAP1 or CAP24) of the shield array while visually checking the peaks on such a captured image as illustrated in FIG. 5. Then, the control unit calculates a shift between Y coordinates when the peaks are connected as a line (dotted line 401 in FIG. 5), and outputs an optical index regarding the horizontal rotation angle of the spectrometer 132 and the CCD camera based on the calculated shift. In a case where the output optical index is not in a range of a predetermined target value, that is, in a case where the horizontal rotation angle is greater than a specification, the service engineer or the like adjusts the position of the spectrometer 132.

<Vertical Rotation Angle (CCD Rotation Angle)>

In Comparative Example, to calculate an index for a vertical rotation angle, the image illustrated in FIG. 5 is used. The service engineer or the like identifies a short wavelength peak of an upper end (CAP24) of the shield array and a short wavelength peak of a lower end (CAP1) of the shield array while visually checking the peaks on such a captured image as illustrated in FIG. 5. Then, the control unit calculates a shift between X coordinates when the peaks are connected as a line (dotted line 403 in FIG. 5), and outputs an optical index regarding the vertical rotation angle of the spectrometer 132 and the CCD camera based on the calculated shift. In a case where the output optical index is not in a range of a predetermined target value, that is, in a case where the vertical rotation angle is greater than a specification, the service engineer or the like adjusts the position of the CCD camera.

<Error in Vertical Direction (Upper/Lower Location)>

In Comparative Example, to calculate an index for an error in the vertical direction, the image illustrated in FIG. 5. is used. The service engineer or the like identifies the position of the upper end (CAP24) of the shield array and the position of the lower end (CAP1) of the shield array while visually checking the positions on such a captured image as illustrated in FIG. 5. Then, the control unit calculates a distance 404 (upper location) from an upper angle-of-view edge to the upper end of the shield array and a distance 405

(lower location) from a lower angle-of-view edge to the lower end of the shield array, and outputs an optical index regarding the error in the vertical direction based on the calculated values.

<Light Intensity Focal Point Error (Focus & Intensity)>

In Comparative Example, to calculate an index for a light intensity focal point error, the image illustrated in FIG. 5 is used. The service engineer or the like identifies a short wavelength peak (501*a*) and a long wavelength peak (501*b*) of the upper end (CAP24) of the shield array, a short wavelength peak (501*c*) and a long wavelength peak (501*d*) of the center (CAP12) of the shield array, a short wavelength peak (501*e*) and a long wavelength peak (501*f*) of the lower end (CAP1) of the shield array while visually checking the peaks on such a captured image as illustrated in FIG. 5. Then, the control unit outputs an optical index regarding the light intensity focal point error based on the light intensity at each peak. This light intensity focal point error is an index indicating a degree of decrease in light intensity (intensity) due to a shift in the focal point of the CCD camera.

<Signal Half Width (FWHM)>

Figure 6:
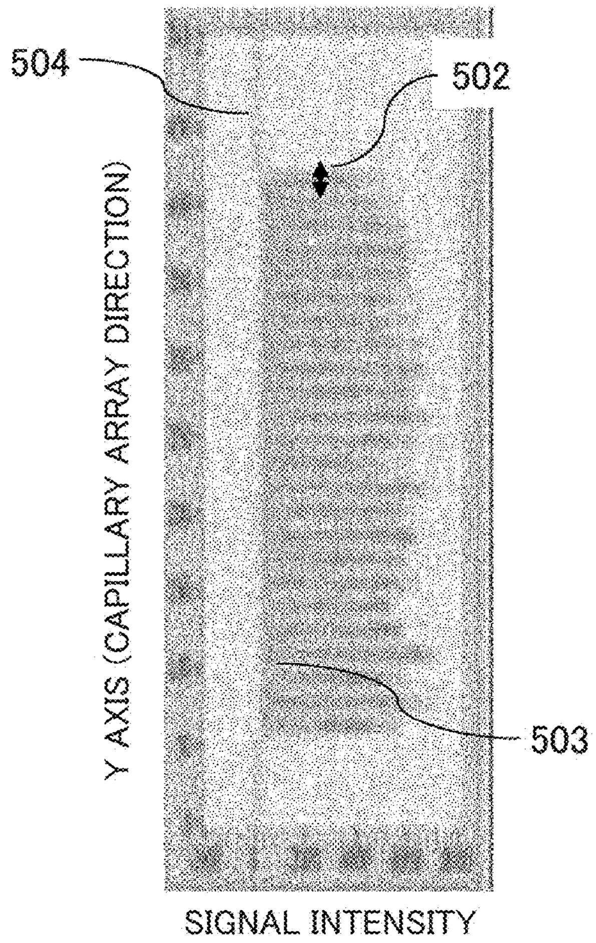
FIG. 6 is a diagram illustrating an example of a light intensity distribution of long wavelength peaks (dotted line 504 in FIG. 5) in a Y axis direction.

In Comparative Example, to calculate an index for a signal half width, an image illustrated in FIG. 6 is used. FIG. 6 is a diagram illustrating an example of a light intensity distribution of long wavelength peaks (dotted line 504 in FIG. 5) in the Y axis direction. The control unit extracts half widths 502 of long wavelength peaks obtained from the positions of the capillaries from the upper end (CAP24) to the lower end (CAP1) of the shield array, and outputs an optical index regarding the signal half width based on each of the extracted half widths 502.

<Noise (Stray Light) between Adjacent Capillaries>

When stray light (leaking light) appears at air gaps (portions corresponding to troughs of a wavelength) between the adjacent capillaries arrayed in the Y axis direction at the time of irradiation with laser light, the stray light may affect signals from the positions of the capillaries. Therefore, the control unit extracts light intensities of the air gaps 503 between the capillaries from the image illustrated in FIG. 6, and outputs an optical index regarding the stray light based on the extracted light intensities.

<Signal-to-Noise Ratio (SN ratio)>

To calculate a signal-to-noise ratio, the capillary array is used, unlike the above-described indices. Then, the control unit calculates an optical index regarding the signal-to-noise ratio based on the ratio of a peak light intensity in a bright state when the capillary array is irradiated with the laser light and a peak light intensity in a dark state when the capillary array is not irradiated with the laser light.

<Signal Intensity Deviation Correction (Normalization)>

Since there are individual differences in optical system between capillary electrophoresis devices, a light intensity obtained by the CCD camera when the laser unit 133 performs irradiation with laser light varies. Therefore, power of the laser unit 133 is adjusted to obtain a constant light intensity. For a correction value required to normalize the light intensity, the capillary array is used as with the signal-to-noise ratio.

EXAMPLE

In Example, the shield array is not used for diagnosing the optical performance, the analysis capillary array 117 (refer to FIG. 3B) for actually performing electrophoresis is used, and the capillary head 112 is connected to the pump mechanism 103. In addition, in Example, a manual operation by the service engineer or the like is not required, and the control unit of the capillary electrophoresis device automatically diagnoses the optical performance. As a trigger for the diagnosis, an instruction may be provided via the input unit in a time period when a user of the capillary electrophoresis device does not perform analysis, or an instruction may be provided from an external monitoring terminal device in a case where the control unit is connected to the monitoring terminal device via a network. In addition, in the diagnosis in Example, the control unit outputs each optical index in one-batch processing by automatically identifying a peak of a Raman signal and the like mainly from a single image captured by the CCD camera, and extracting a coordinate, light intensity, and the like thereof. The following description is made for each optical index.

<Coaxiality of Upper and Lower Beams (Laser Beam Over Lapping)>

Figure 7:
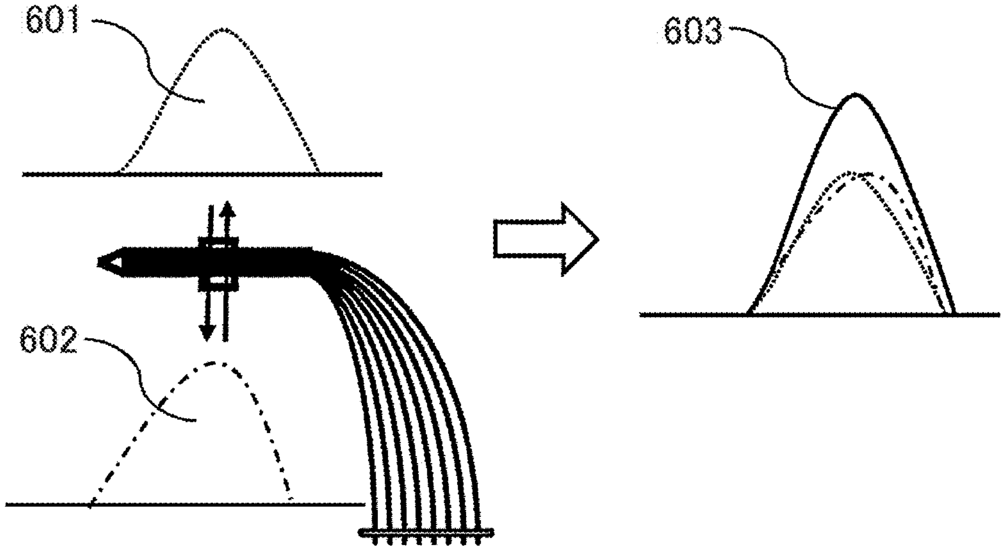
FIG. 7 is a conceptual diagram illustrating a light intensity waveform of the upper beam, a light intensity waveform of the lower beam, and a combined waveform of the upper and lower beams.
Figure 8:
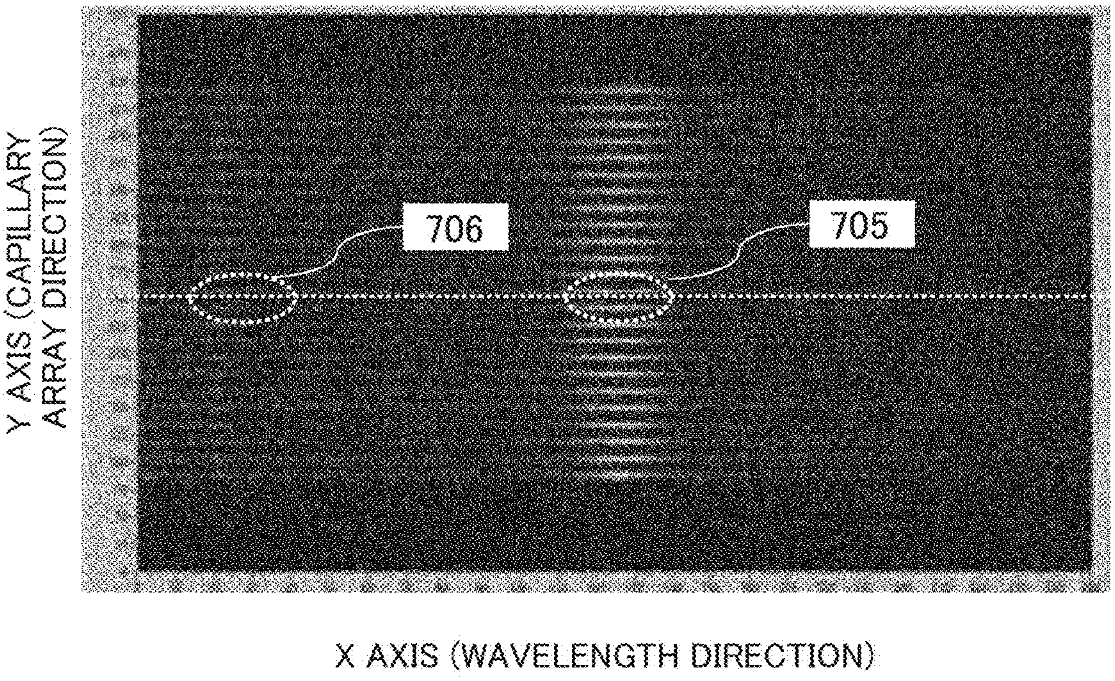
FIG. 8 is a diagram illustrating an example of an image acquired when the capillary array is irradiated with the upper and lower beams.
Figure 9:
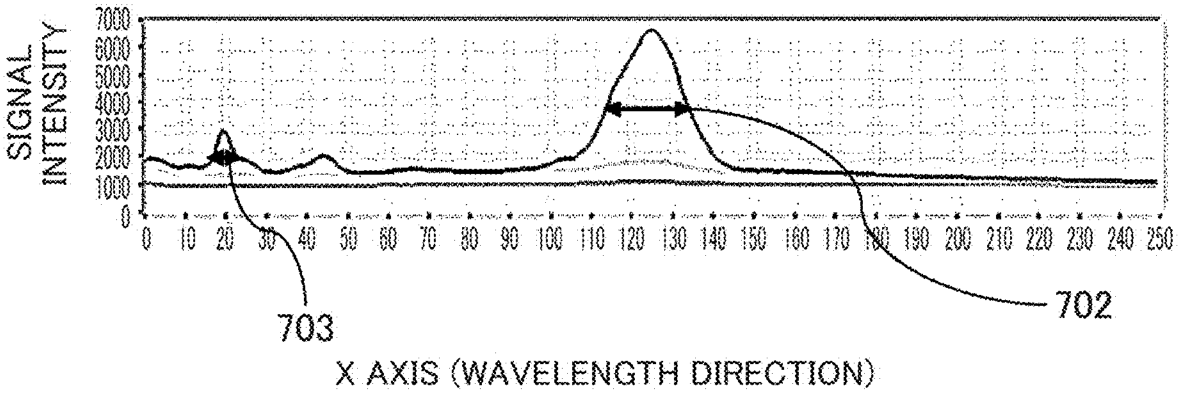
FIG. 9 is a diagram illustrating an example of a signal intensity distribution of the center of the capillary array in a vertical direction when the capillary array is irradiated with the upper and lower beams.

In Example, the CCD camera captures a common single image of combined Raman scattered light when the capillary array is irradiated with laser light from above and below the capillary array simultaneously. FIG. 7 is a conceptual diagram illustrating a light intensity waveform of the upper beam, a light intensity waveform of the lower beam, and a combined waveform of the upper and lower beams. FIG. 8 is a diagram illustrating an example of an image acquired when the capillary array is irradiated with the upper and lower beams. FIG. 9 is a diagram illustrating an example of a signal intensity distribution of the center of the capillary array in the vertical direction when the capillary array is irradiated with the upper and lower beams. In FIGS. 8 and 9, the horizontal axis (X axis) direction indicates wavelength information of Raman scattered light obtained when a DNA base sequence of a sample is irradiated with laser light, the left side in the X axis indicates a short wavelength side, and the right side in the X axis indicates a long wavelength side. In addition, in FIG. 8, the vertical axis (Y axis) direction indicates position information of the capillaries.

As illustrated in FIG. 7, a single image captured by the CCD camera includes a combined waveform 603 obtained by combining the light intensity waveform 601 of the upper beam and the light intensity waveform 602 of the lower beam. In a case where the optical axis of the upper beam and the optical axis of the lower beam shift from each other, a peak value of the combined waveform decreases and a half width of the peak increases, compared to a case where the optical axes do not shift from each other.

Therefore, the control unit identifies a long wavelength peak 705 of the center (CAP12) of the capillary array in the vertical direction in a single image as illustrated in FIG. 8 by image processing, and extracts a half width 702 of the long wavelength peak 705 as illustrated in FIG. 9. Further, the control unit outputs an optical index regarding the coaxiality of the upper and lower beams by comparing the extracted half width 702 with a reference value stored in the storage unit in advance.

Since the light intensity on the long wavelength side is higher than the light intensity on the short wavelength side, there is an advantage that the half width is easily identified. However, a half width 703 of a short wavelength peak 706 may be extracted and an index for the coaxiality may be calculated by comparing with a reference value for short wavelengths. In addition, the index may be calculated using both of the long wavelength peak 705 and the short wavelength peak 706. Since it is considered that the light intensity changes due to a shift in the focal point, a correction coefficient may be given for the half width on the assumption of a shift in the focal point. Further, the control unit can identify a predetermined absolute value (for example, a peak value) other than the half width from the combined waveform included in the single image, and calculate the index by comparing the absolute value with the reference value determined in advance. In each case, an absolute value detected using the actual capillary array is compared with the reference value without a relative value detected using the shield array as in Comparative Example, and thus a highly accurate index can be calculated.

<Horizontal Rotation Angle (Grating Rotation Angle)>

The control unit identifies a long wavelength peak and a short wavelength peak of an end portion (CAP1 or CAP24) of the capillary array in such a single image as illustrated in FIG. 8 by image processing, and calculates a shift between Y coordinates of the peaks. Further, the control unit outputs an optical index regarding the rotation angle of the spectrometer 132 and the CCD camera in the horizontal direction based on the calculated shift. Since this optical index is calculated based on the absolute value detected using the capillary array actually used for electrophoresis, the optical index is a more accurate index than that in Comparative Example.

<Vertical Rotation Angle (CCD Rotation Angle)>

The control unit identifies the short wavelength peak of the upper end (CAP24) of the capillary array and the short wavelength peak of the lower end (CAP1) of the capillary array in such a single image as illustrated in FIG. 8 by image processing. Further, the control unit calculates a shift between X coordinates of the identified peaks, and outputs an optical index regarding the vertical rotation angle of the spectrometer 132 and the CCD camera based on the calculated shift. Since this optical index is calculated based on the absolute value detected using the capillary array actually used for electrophoresis, the optical index is a more accurate index than that in Comparative Example.

<Error in Vertical Direction (Upper/Lower Location)>

The control unit identifies the position of the upper end (CAP24) of the capillary array and the position of the lower end (CAP1) of the capillary array in such a single image as illustrated in FIG. 8 by image processing. Further, the control unit calculates a distance (upper location) from the upper angle-of-view edge to the upper end of the capillary array and a distance (lower location) from the lower angle-of-view edge to the lower end of the capillary array, and outputs an optical index regarding an error in the vertical direction based on the calculated values. Since this optical index is calculated based on the absolute value detected using the capillary array actually used for electrophoresis, the optical index is a more accurate index than that in Comparative Example.

<Light Intensity Focal Point Error (Focus & Intensity)>

The control unit identifies a short wavelength peak and a long wavelength peak of the upper end (CAP24) of the capillary array, a short wavelength peak and a long wavelength peak of the center (CAP12) of the capillary array, and a short wavelength peak and a long wavelength peak of the lower end (CAP1) of the capillary array in such a single image as illustrated in FIG. 8 by image processing. Further, the control unit outputs an optical index regarding a light intensity focal point error based on the light intensity of each of the peaks. Since this optical index is calculated based on the absolute value detected using the capillary array actually used for electrophoresis, the optical index is a more accurate index than that in Comparative Example.

<Signal Half Width (FWHM)>

The control unit extracts half widths of long wavelength peaks obtained from the positions of the capillaries from the upper end (CAP24) to the lower end (CAP1) of the capillary array from a single image as in the above description, and outputs an optical index regarding a signal half width based on the extracted half widths. Since this optical index is calculated based on the absolute value detected using the capillary array actually used for electrophoresis, the optical index is a more accurate index than that in Comparative Example.

<Noise (Stray Light) between Adjacent Capillaries>

The control unit extracts light intensities obtained from the air gaps 503 between the capillaries from a single image as in the above description, and outputs an optical index regarding stray light based on the extracted light intensities. Since this optical index is calculated based on the absolute value detected using the capillary array actually used for electrophoresis, the optical index is a more accurate index than that in Comparative Example.

<Signal-to-Noise Ratio (SN Ratio)>

A signal-to-noise ratio is calculated basically in a similar manner to Comparative Example, but the following diagnosis is further performed in Example. For example, the control unit divides a single image in a bright state into a plurality of sections in a wavelength direction (X axis direction), calculates a collective light intensity in each of the sections, and calculates a peak collective light intensity. Next, the control unit divides a single image in a dark state into sections in a similar manner, and calculates a peak collective light intensity in a similar manner. Thereafter, the control unit calculates the signal-to-noise ratio based on the ratio of the peak collective light intensities calculated for each of the states. By dividing the X-axis direction into a plurality of sections in this manner, an effect similar to a low-pass filter is generated, and the effect of steep noise can be removed. In addition, it is also possible to calculate an index regarding the effect of dark current noise of the CCD camera from the signal intensity of the peak value of the image in the dark state. Further, it is also possible to index a variation in signals for each of the plurality of sections obtained by dividing the image in the bright state.

<Signal Intensity Deviation Correction (Normalization)>

Signal intensity deviation correction is performed by a similar method to that in Comparative Example.

As described above, in Example, the optical indices for the coaxiality of the upper and lower beams, the horizontal rotation angle, the vertical rotation angle, the error in the vertical direction, the light intensity focal point error, the signal half width, and noise from the adjacent capillaries are calculated using the capillary array actually used for analysis. That is, since all the optical indices are absolute indices, accurate optical performance diagnosis and accurate optical adjustment can be performed by comparing with absolute target values (specifications) determined in advance. In addition, the capillary electrophoresis device automatically outputs each of the optical indices without a manual operation by the service engineer or the like, and thus the optical performance is easily diagnosed.

Modification

The results of the diagnosis by the automatic optical diagnosis function as described above, that is, the optical indices are accumulated in the storage unit of the capillary electrophoresis device. Therefore, an operation performed on the input unit by the user or the service engineer can cause the control unit to output changes over time in the optical indices accumulated in the storage unit to the output unit. The changes over time in the optical indices can be used for failure prediction or the like.

In addition, the optical indices output by the automatic optical diagnosis function may be continuously transmitted to the monitoring terminal device connected to the control unit via the network regardless of whether the optical indices are in the ranges of the target values (specifications). In a case where the optical indices are not in the ranges of the target values, the control unit may transmit a notification to the monitoring terminal device. In a case where the optical indices are not in the ranges of the target values, the service engineer or the like goes to a site where the capillary electrophoresis device is installed, and performs optical adjustment or the like.

The present invention is not limited to the above-described Example and modification, and various modification can be made. For example, the above-described control unit may be divided into an operation control unit that controls the operation of each unit of the capillary electrophoresis device, and a diagnosis control unit that performs the diagnosis of the optical performance based on a signal from the CCD camera.

LIST OF REFERENCE SIGNS

101: capillary electrophoresis device
102: capillary
103: pump mechanism
104: high-voltage power supply
105: array holder
106: plunger pump
107: block
108: check valve
109: polymer container
110: anode buffer container
111: anode electrode
112: capillary head
113: electric valve
114: light irradiation mechanism
115: two-dimensional detecting unit
116: detecting area
117: capillary array
118: constant-temperature bath
119: fan
120: heating and cooling mechanism
121: buffer container
122: cleaning container
123: waste liquid container
124: sample container
125: conveyance mechanism
126: hollow electrode
127: capillary cathode end
128: chamber
129: load header
130: moving stage
131: grip
132: spectrometer
133: laser unit
134: reflecting mirror
135: polarizer
136: beam splitter
137: condenser lens
138: reference base
139: optical axis
140: laser light
141: shield array

The invention claimed is:

1. A capillary electrophoresis device comprising:
a capillary array including a plurality of capillaries;
a light source that causes laser light to oscillate;
a detecting unit that detects light emitted when the capillary array is irradiated with the laser light; and
a control unit that performs predetermined processing based on a signal from the detecting unit, wherein
the control unit extracts a predetermined absolute value related to an optical index based on an image captured by the detecting unit, and calculates the optical index by comparing the extracted absolute value with a predetermined reference value,
the detecting unit captures a common single image of Raman scattered light combined when the capillary array is irradiated with the laser light from above and below the capillary array, and
the control unit extracts a predetermined absolute value from a combined waveform of the Raman scattered light included in the single image, and calculates an optical index regarding coaxiality of upper and lower laser light by comparing the absolute value with the predetermined reference value.

2. The capillary electrophoresis device according to claim 1, wherein
the control unit extracts a half width of a peak included in the combined waveform, and calculates an optical index regarding the coaxiality of the upper and lower laser light by comparing the extracted half width with a reference value.

3. The capillary electrophoresis device according to claim 1, further comprising:
a storage unit that stores the optical index, wherein
the control unit outputs changes over time in the optical index stored in the storage unit.

4. An optical performance diagnostic method for a capillary electrophoresis device, the method comprising:
a step of acquiring an image captured by a detecting unit in a state in which a capillary array to be used for electrophoresis is mounted;
a step of extracting, by a control unit, a predetermined absolute value regarding an optical index based on the acquired image; and
a step of calculating, by the control unit, the optical index by comparing the extracted absolute value with a predetermined reference value;
wherein the detecting unit captures a common single image of Raman scattered light combined when the capillary array is irradiated with laser light from above and below the capillary array, and
wherein the control unit extracts a predetermined absolute value from a combined waveform of the Raman scattered light included in the single image, and calculates an optical index regarding coaxiality of upper and lower laser light by comparing the absolute value with the predetermined reference value.

* * * * *